United States Patent Office 2,798,086
Patented July 2, 1957

2,798,086

AMIDES AND ESTERS OF IMINODIPHOSPHORIC ACID AND NITRILOTRIPHOSPHORIC ACID

Harry W. Coover, Jr., and Richard L. McConnell, Kingsport, Tenn., assignors to Eastman Kodak Company, Rochester, N. Y., a corporation of New Jersey No Drawing. Application February 14, 1956,
Serial No. 565,306

20 Claims.  (Cl. 260—461)

This invention relates to novel phosphorus-containing compounds and to a process for preparing these compounds. In a specific aspect, this invention relates to amides and esters of iminodiphosphoric acid and iminodithiophosphoric acid and to a process for preparing said amides and esters. In another specific aspect, this invention relates to amides and esters of nitrilotriphosphoric acid and nitrilotrithiophosphoric acid and to a process for preparing said amides and esters.

In accordance with this invention, we have found that compounds having the structural formula:

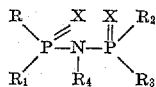

wherein R, $R_1$, $R_2$ and $R_3$ are alkoxy radicals containing 1–4 carbon atoms, for example, methoxy, ethoxy, propoxy and butoxy, a phenoxy radical or a dialkylamido radical wherein each alkyl group contains 1–4 carbon atoms, such as dimethylamido, diethylamido, dipropylamido, dibutylamido and the like. X is selected from the group consisting of oxygen and sulfur and $R_4$ can be hydrogen or an alkyl radical containing 1–4 carbon atoms, such as methyl, ethyl, propyl, butyl and the like. Additionally, $R_4$ can be a radical having the formula:

wherein $R_5$ and $R_6$ are selected from the group set forth for R, $R_1$, $R_2$ and $R_3$ above.

The new compounds of this invention are prepared by reacting certain halophosphates with amidophosphates as defined below. The halophosphates that are employed in the reaction have the structural formula:

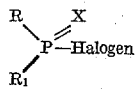

wherein R and $R_1$ are as described above and X is selected from the group consisting of oxygen and sulfur. The amidophosphates that are employed in the process have the structural formula:

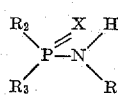

wherein $R_2$, and $R_3$ and $R_4$ are as described above and X is either oxygen or sulfur. The preparation of these esters and amides in accordance with this invention can be illustrated by the following equations:

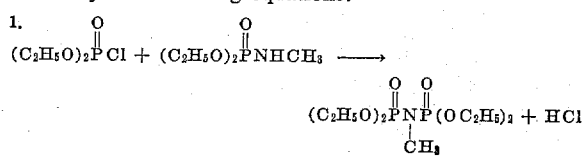

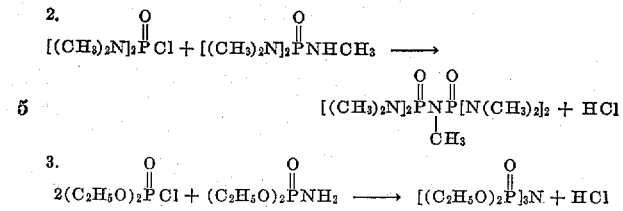

3.  $2(C_2H_5O)_2\overset{O}{\overset{\|}{P}}Cl + (C_2H_5O)_2\overset{O}{\overset{\|}{P}}NH_2 \longrightarrow [(C_2H_5O)_2\overset{O}{\overset{\|}{P}}]_3N + HCl$ Nitrilotriphosphoric acid amides can be prepared in reaction similar to Equation 3 above. Also, mixed esteramides can be prepared by a suitable selection of reactants for use in the above equations.

The reaction is preferably carried out in the presence of a dry inert solvent such as benzene, toluene, chlorobenzene, dioxane or a petroleum fraction, but these solvents are not essential for the process. The reaction is usually carried out at a temperature within the range of 0 to 200° C. When a solvent is used, it is convenient to carry out the reaction at about the boiling point of the solvent.

Since hydrogen halide is formed during the reaction, optimum results can be obtained by employing in the reaction mixture a suitable hydrogen halide acceptor. Among the hydrogen halide acceptors that can be used are the tertiary nitrogen bases. Specifically, pyridine, 2-methyl pyridine, 3-methyl pyridine, 4-methyl pyridine, 2-ethyl pyridine, 3-ethyl pyridine, 4-ethyl pyridine as well as other lower alkyl pyridines can be used. In addition, the trialkylamines, for example, trimethylamine, triethylamine, tripropylamine, tributylamine and the like can be satisfactorily employed.

For optimum results, the halophosphate and amidophosphate are employed in equimolar quantities, particularly when the amidophosphate has a single hydrogen atom attached to the nitrogen atom. When the amidophosphate has two hydrogen atoms attached to the nitrogen atom, it is preferable to employ 2 moles of the halophosphate for each mole of the amidophosphate. Also for each mole of hydrogen halide that is formed in the reaction, it is preferred to employ a mole of the hydrogen halide acceptor. However, it will be understood that reactant quantities outside of these specified amounts can be employed without departing from the scope of the invention.

The following examples illustrate the compounds of this invention and their method of preparation:

*Example I.—Methyliminodisphosphoric acid, tetraethyl ester*

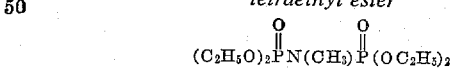

34.4 g. of diethyl chlorophosphate, 33.4 g. of diethyl methylamidophosphate, and 15.8 g. of pyridine were dissolved in 250 ml. of dry benzene and refluxed for 12 hours. The benzene solution was separated from the pyridine hydrochloride and washed with 100 ml. of water. After drying the benzene solution over sodium sulfate, the benzene was removed by distillation leaving a viscous oil which was suitable for use in pesticidal formulations. The crude oil, when purified by vacuum distillation, boiled at 147–153° C. at 1.3 mm.

*Example II.—Methyliminodiphosphoric acid, tetrakis (dimethylamide)*

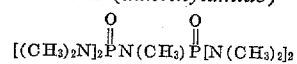

This amide was prepared from 28.0 g. of bis(dimethylamido)chlorophosphate, 33.0 g. of bis(dimethylamido) methylamidophosphate, and 15.8 g. of pyridine according to the procedure given in Example I. The product was a viscous oil which distilled at 145–149° C. at 1.0 mm.

Example III.—Iminodiphosphoric acid, dibutyl ester bis-(dimethylamide)

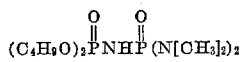

This ester amide was prepared by reacting 45.7 g. of dibutyl chlorophosphate, 30.2 g. of bis(dimethylamido)-phosphoramide, and 15.8 g. of pyridine for 12 hours in refluxing toluene. The product was isolated according to the procedure given in Example I.

Example IV.—Butyliminodithiodiphosphoric acid, diethyl ester bis(dimethylamide)

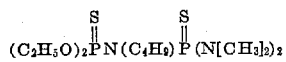

This viscous, oily product was prepared from 37.7 g. of diethyl chlorothiophosphate, 44.6 g. of bis(dimethylamido)butylamidothiophosphate, and 15.8 g. of pyridine according to the procedure given in Example III.

Example V.—Methyliminomonothiodiphosphoric acid, diethyl ester bis(dibutylamide)

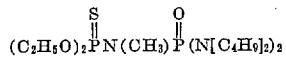

A mixture of 37.7 g. of diethyl chlorothiophosphate, 66.6 g. of bis(dibutylamido)methylamidophosphate, and 15.8 g. of pyridine were refluxed in 300 ml. of dry xylene for 16 hours. The viscous, water-insoluble, oily product was isolated by evaporating the solvent under reduced pressure.

Example VI.—Methyliminodiphosphoric acid, symmetrical diethyl ester bis(dimethylamide)

This mixed ester amide was prepared by reacting 34.3 g. of dimethylamido ethyl chlorophosphate, 33.2 g. of dimethylamido ethyl methylamidophosphate, and 15.8 g. of pyridine according to the procedure given in Example I.

Example VII.—Methyliminodiphosphoric acid, diphenyl diethyl ester

This ester was prepared by reacting 53.7 g. of diphenyl chlorophosphate, 33.4 g. of diethyl methylamidophosphate and 15.8 g. of pyridine, according to the procedure given in Example III.

Example VIII.—Nitrilotriphosphoric acid, hexaethyl ester

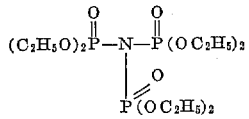

This ester was prepared by the reaction of 68.8 g. of diethyl chlorophosphate, 30.6 g. of diethyl amidophosphate, and 32 g. of pyridine according to the procedure given in Example III.

Example IX.—Nitrilotriphosphoric acid, hexakis(dimethylamide)

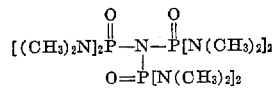

This amide was prepared by reacting 56 g. of bis(dimethylamido)chlorophosphate, 30.2 g. of bis(dimethylamido)amidophosphate and 32 g. of pyridine according to the procedure given in Example III.

Example X.—Methyliminodiphosphoric acid, tetraphenyl ester

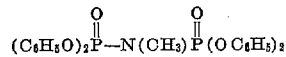

This ester was prepared by reacting 53.7 g. of diphenyl chlorophosphate, 52.6 g. of diphenyl methylamidophosphate and 15.8 g. of pyridine according to the procedure given in Example III.

Example XI.—Nitrilotriphosphoric acid, tetraphenyl ester bis(dimethylamide)

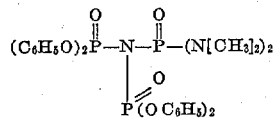

This ester amide was prepared by reacting 107.4 g. of diphenyl chlorophosphate, 30.2 g. of bis(dimethylamido)-amidophosphate and 32 g. of pyridine according to the procedure given in Example III.

The products of this invention are effective pesticides for the control of a number of insects, including spiders, mites, aphids, beetles and flies. The products of this invention can be used as pesticides either in spray or dust formulations. Dispersing or wetting agents are usually used for the preparation of aqueous spraying solutions. Sprays may also be prepared by using petroleum fractions. In the preparation of a dust, the products of this invention are dispersed on an inert finely divided solid. Suitable concentrations of the pesticide range from 0.2 to 8 pounds per 1000 pounds of spray mixture and 0.1 to 10 percent by weight for dust formulations.

The following examples specifically illustrate the use of the compounds of this invention as pesticides:

Example XII.—Use of tetraethyl ester of methyliminodiphosphoric acid as insecticide A. An acetone solution containing 1,000 p. p. m. of the toxicant was prepared. One microliter of this toxicant solution was applied to the mid-thoracic point of each of 20 four-day-old female flies. These flies had been carefully separated from the males under carbon dioxide anesthesia since female flies give a more reproducible test. After treatment with the toxicant solution, the flies were placed in small cylindrical recovery cages. All flies were dead when observed after 24 hours.

B. The acetone solution described in A above was diluted in water to give a 100 p. p. m. concentration of the toxicant. Ten third instar mosquito larvae of *C. quinquifasciatus* were removed from larval rearing pans and placed in this solution. After 24 hours, all mosquito larvae were dead.

Example XIII.—Use of tetrakis (dimethylamide of methyliminodiphosphoric acid as insecticide An acetone solution containing 10,000 p. p. m. of the toxicant was prepared. This solution was diluted with water to give a final concentration of 1,000 p. p. m. Two heavily infested bean leaves containing adult two-spotted mites (*T. bimaculatus*) were carefully dipped in the above solution and dried in a gentle air stream. The leaves were placed on damp paper toweling in Petri dishes. After 24 hours, 98% of the mites were dead.

Example XIV.—Use of hexaethyl ester of nitrilotriphosphoric acid as insecticide An acetone solution containing 10,000 p. p. m. of the toxicant was prepared. This solution was diluted with water to give a final concentration of 1,000 p. p. m.. Two heavily infested bean leaves containing adult two-spotted mites (*T. bimaculatus*) were carefully dipped into the above solution and dried in a gentle air stream. The leaves were placed on damp paper toweling in Petri dishes. After 24 hours, 92% of the mites were dead.

When the tests described in Examples XII, XIII, and XIV are carried out using acetone or mixtures of acetone and water containing no toxicant, none of the insects are killed.

We claim:

1. The process for producing a compound having the structural formula:

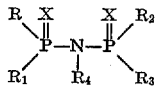

wherein R, R₁, R₂ and R₃ are radicals selected from the group consisting of alkoxy having 1–4 carbon atoms, phenoxy, and dialkylamido wherein each alkyl group contains 1–4 carbon atoms, X is selected from the group consisting of oxygen and sulfur and R₄ is selected from the group consisting of hydrogen, alkyl having 1–4 carbon atoms, and

wherein R₅ and R₆ are selected from the group set forth for R, R₁, R₂ and R₃ above and X is selected from the group consisting of oxygen and sulfur, which comprises reacting a halophosphate having the structural formula:

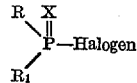

wherein R and R₁ are selected as set forth above, and X is selected from the group consisting of oxygen and sulfur with an amidophosphate having the structural formula:

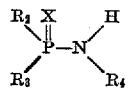

wherein R₂, R₃ and R₄ are as set forth above and X is selected from the group consisting of oxygen and sulfur.

2. The process for producing a tetraalkyl ester of an alkyliminodiphosphoric acid which comprises reacting a dialkylhalophosphate, each alkyl group containing 1–4 carbon atoms, with a dialkyl alkylamidophosphate, each alkyl group containing 1–4 carbon atoms.

3. The process for producing the tetraethyl ester of methyliminodiphosphoric acid which comprises reacting diethyl chlorophosphate with diethyl methylamidophosphate in the presence of pyridine as a hydrogen chloride acceptor and benzene as a solvent at the refluxing temperature of benzene.

4. The process for producing a tetrakis dialkylamide derivative of an alkyliminodiphosphoric acid which comprises reacting a bis(dialkylamido) halophosphate, each alkyl group containing 1–4 carbon atoms, with a bis-(dialkylamido)alkylamido phosphate, each alkyl group containing 1–4 carbon atoms.

5. The process for producing the tetrakis diemethylamide derivative of methyliminodiphosphoric acid which comprises reacting bis(dimethylamido)chlorophosphate with bis(dimethylamido) methylamidophosphate in the presence of pyridine as a hydrogen chloride acceptor and benzene as a solvent at the refluxing temperature of benzene.

6. The process for producing a dialkyl ester bis (dialkylamide) derivative of iminodiphosphoric acid which comprises reacting a dialkyl halophosphate, each alkyl group containing 1–4 carbon atoms, with a bis (dialkylamido) phosphoramide, each alkyl group containing 1–4 carbon atoms.

7. The process for producing the dibutyl ester bis (dimethylamide) derivative of iminodiphosphoric acid which comprises reacting dibutyl chlorophosphate with bis(dimethylamido) phosphoramide in the presence of pyridine as a hydrogen chloride acceptor and toluene as a solvent at the refluxing temperature of toluene.

8. The process for producing a hexaalkyl ester of nitrilotriphosphoric acid which comprises reacting a dialkyl halophosphate, each alkyl group containing 1–4 carbon atoms, with a dialkyl amidophosphte, each alkyl group containing 1–4 carbon atoms.

9. The process for producing the hexaethyl ester of nitrilotriphosphoric acid which comprises reacting diethyl chlorophosphate with diethyl amidophosphate in the presence of pyridine as a hydrogen chloride acceptor and toluene as a solvent at the refluxing temperature of toluene.

10. The process for producing a hexakis (dialkylamide) derivative of nitrilotriphosphoric acid which comprises reacting a bis (dialkylamido) chlorophosphate, each alkyl group containing 1–4 carbon atoms, with a bis (dialkylamido) amidophosphate, each alkyl group containing 1–4 carbon atoms.

11. The process for producing the hexakis (dimethylamido) derivative of nitrilotriphosphoric acid which comprises reacting bis (dimethylamido) chlorophosphate with bis (dimethylamido) amidophosphate in the presence of pyridine as a hydrogen chloride acceptor and toluene as a solvent at the refluxing temperature of toluene.

12. As a new composition of matter, a compound having the structural formula:

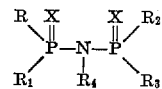

wherein R, R₁, R₂ and R₃, are radicals selected from the group consisting of alkoxy having 1–4 carbon atoms, phenoxy, and dialkylamido wherein each alkyl group contains 1–4 carbon atoms, X is selected from the group consisting of oxygen and sulfur and R₄ is selected from the group consisting of hydrogen, alkyl having 1–4 carbon atoms and

wherein R₅ and R₆ are selected from the group set forth for R, R₁, R₂ and R₃ above and X is selected from the group consisting of oxygen and sulfur.

13. As a new composition of matter, a tetraalkyl ester of an acid selected from the group consisting of alkyliminodiphosphoric and, an alkyliminodithiophosphoric acid, each of said alkyl radicals containing up to 4 carbon atoms.

14. As a new composition of matter, the tetraethyl ester of methyliminodiphosphoric acid.

15. As a new composition of matter, a tetrakis (dialkylamide) derivative of an acid selected from the group consisting of alkyliminodiphosphoric acid and alkyliminodithiophosphoric acid, each of said alkyl radicals containing up to 4 carbon atoms.

16. As a new composition of matter, the tetrakis dimethylamide of methyliminodiphosphoric acid.

17. As a new composition of matter, a hexaalkyl ester of an acid selected from the group consisting of nitrilotriphosphoric acid and nitrilotrithiophosphoric acid, said alkyl radicals containing up to 4 carbon atoms.

18. As a new composition of matter, the hexaethyl ester of nitrilotriphosphoric acid.

19. As a new composition of matter, a hexakis (dialkylamide) derivative of an acid selected from the group consisting of nitrilotriphosphoric acid and nitrilotrithiophosphoric acid, said alkyl radicals containing up to 4 carbon atoms.

20. As a new composition of matter, a dialkyl ester bis(dialkylamide) of an acid selected from the group consisting of alkyliminodiphosphoric acid and alkyliminodithiophosphoric acid, each of said alkyl radicals containing up to 4 carbon atoms.

No references cited.

UNITED STATES PATENT OFFICE
CERTIFICATE OF CORRECTION

Patent No. 2,798,086                          July 2, 1957

Harry W. Coover, Jr. et al.

It is hereby certified that error appears in the printed specification of the above numbered patent requiring correction and that the said Letters Patent should read as corrected below.

Column 5, line 12, claim 1, for "$R_2$", second occurrence, read -- $R_3$ --; line 57, claim 5, for "diemethyl-" read -- dimethyl- --; column 6, line 4, claim 8, for "amidophosphte" read -- amidophosphate --.

Signed and sealed this 1st day of October 1957.

(SEAL)
Attest:

KARL H. AXLINE
Attesting Officer

ROBERT C. WATSON
Commissioner of Patents